UNITED STATES PATENT OFFICE.

JOHN F. DERY, OF NEW YORK, N. Y.

FIX MATERIAL FOR USE IN PUDDLING AND BASIC OPEN-HEARTH FURNACES.

1,175,933.

Specification of Letters Patent. Patented Mar. 21, 1916.

No Drawing. Application filed July 2, 1915. Serial No. 37,686.

*To all whom it may concern:*

Be it known that I, JOHN F. DERY, a citizen of the United States, residing at New York city, in the county of New York and State of New York, have invented certain new and useful Improvements in Fix Material for Use in Puddling and Basic Open-Hearth Furnaces, of which the following is a specification.

This invention relates to the puddling and basic open hearth treatments of iron, and it has for its objects to provide, in block or lump form for use as fix in such furnaces, a composition of matter which shall contain, with flue-dust, iron fines, or other comminuted form of iron, material giving ample power to the blocks or lumps to resist disruption incident to handling and shipping and the disintegrating and fusing action of the furnace heat and supplying to the furnace charge a definite percentage of the lime required for purifying the charge, without also bringing to the latter constituents having in a prohibitive degree acid or other deleterious effect on the same.

So far as I am aware, no one has heretofore successfully accomplished the object outlined above. Various more or less successful attempts have been made to compound iron fines and flue dust in blocks or lumps, but although the blocks or lumps in those cases may have perhaps possessed the strength required for withstanding rough usage and the needed degree of resistance to heat and disintegration, they were capable of being used only in the blast furnace, because they invariably contained a percentage of silica, and in most cases included other ingredients, entirely prohibitive in the case of the puddling and basic open hearth treatments. The problem has principally been to produce a compound whose binder would have the necessary strength and the power to resist disintegrating and fusing action of the furnace heat, without at the same time containing silica in a proportion that would not be practicable for use in these furnaces. The usual limit of silica in fix ores is about 7%. I have attained the desired object by the compound herein set forth.

According to the preferred form of my invention, I take of lime one part, Portland cement two parts, and iron fines or flue dust nine parts, and mix these ingredients together thoroughly, with enough water to make the mixture sufficiently fluid to be poured into molds, and when the mixture has been poured into the molds and dried in any manner calculated to produce the best results in point of strength and heat-resisting power (as by removing the mold walls after the formed blocks are two days old to allow air to circulate freely around them and sprinkling them once a day thereafter for three days) the resultant blocks are ready for use.

Blocks formed from the compound herein set forth have great strength—ample to resist the disrupting influences incident to handling and shipping—and they have high heat-resisting power, a test block of the size of a two inch cube having been subjected by me to 2700 degrees F. for twenty-five minutes before fusion set in and without breaking down or disintegrating. The selection of the cement and lime in approximately the proportions (in the entire mass) named as the material with which the comminuted iron is compounded has this distinct advantage, besides making the improved composition resistant to the needed degree to disrupting influences and fusion and disintegration in the furnace, that a flux is afforded, the compound being richer in lime than natural ores, while the quantity of silica is low enough to meet the requirements of puddling and basic open hearth operators.

While I find that Portland cement best subserves the objects of my invention, I am nevertheless not limited thereto, as any other basic alumino-silicate cement which will give the desired strength to the blocks and the power to resist to the desired degree the fusing action of the heat and also to resist disintegration in the furnace, and, when used in the proper quantity to attain this end, will at the same time be low enough in silica to bring this element within the limit mentioned above, falls within the scope of my invention.

Should the fines or flue dust carry silica in such a quantity that the compound would be too high in silica it may be treated, as in a separating mill or otherwise, to reduce the proportion of silica.

Having thus fully described my invention, what I claim as new and desire to secure by Letters Patent is:—

1. The hereindescribed basic open hearth or puddling furnace fix compound containing comminuted iron and a binder contributing to the compound silica in a quantity not exceeding 7% of the whole mass, the binder including lime and a basic alumino-silicate cement and the iron and binder being in substantially the proportion of 3 parts to 1, respectively.

2. The hereindescribed basic open hearth or puddling furnace fix compound containing comminuted iron, lime and a basic alumino-silicate cement contributing to the compound silica in a quantity not exceeding 7% of the whole mass, the iron, cement and lime being in approximately the following proportions, to wit: iron, nine parts; cement, two parts; and lime, one part.

3. The herein described basic open hearth or puddling furnace fix compound containing the following ingredients in approximately the proportions named, to wit, comminuted iron, nine parts; Portland cement, two parts; and lime, one part.

In testimony whereof I affix my signature.

JOHN F. DERY.